US010479934B1

(12) United States Patent
Doty et al.

(10) Patent No.: US 10,479,934 B1
(45) Date of Patent: Nov. 19, 2019

(54) STABILIZED SCINTILLATOR

(71) Applicant: National Technology & Engineering Solutions of Sandia, LLC, Albuquerque, NM (US)

(72) Inventors: F. Patrick Doty, Livermore, CA (US); Pin Yang, Albuquerque, NM (US); Xiaowang Zhou, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 321 days.

(21) Appl. No.: 15/239,636

(22) Filed: Aug. 17, 2016

(51) Int. Cl.
*C09K 11/77* (2006.01)
*C09K 15/02* (2006.01)

(52) U.S. Cl.
CPC ........ *C09K 11/772* (2013.01); *C09K 11/7705* (2013.01); *C09K 15/02* (2013.01)

(58) Field of Classification Search
CPC .................... C09K 11/772; C09K 11/7705
See application file for complete search history.

(56) References Cited

U.S. PATENT DOCUMENTS

| | | | |
|---|---|---|---|
| 5,039,858 A | 8/1991 | Anderson et al. | |
| 6,437,336 B1 | 8/2002 | Pauwels et al. | |
| 6,818,896 B2 | 11/2004 | Pauwels et al. | |
| 7,060,982 B2 | 6/2006 | Ichinose et al. | |
| 7,067,815 B2 | 6/2006 | Dorenbos et al. | |
| 7,067,816 B2 | 6/2006 | Dorenbos et al. | |
| 7,084,403 B2 * | 8/2006 | Srivastava | C09K 11/7772 250/361 R |
| 7,129,494 B2 | 10/2006 | Shah | |
| 7,368,719 B2 * | 5/2008 | Srivastava | C09K 11/772 250/361 R |
| 7,576,329 B2 * | 8/2009 | Srivastava | C09K 11/7704 250/361 R |
| 7,655,919 B1 * | 2/2010 | Shah | G01T 1/202 250/370.11 |
| 2004/0000662 A1 | 1/2004 | Riman et al. | |
| 2010/0268074 A1 * | 10/2010 | Van Loef | A61B 6/032 600/431 |
| 2016/0124111 A1 * | 5/2016 | Yang | G01V 5/06 250/261 |

FOREIGN PATENT DOCUMENTS

WO 2001060945 A2 8/2001

OTHER PUBLICATIONS

Gleason et al, "Divalent manganese in tetragonal sites of Cs2NaYCl6", The Journal of Chemical Physics, 91(5), 2776-2778, Sep. 1, 1989.*
Chin, G.Y., et al., "Strengthening of Alkali Halides by Divalent-Ion Additions", Journal of the American Ceramic Society, Jul. 1973, vol. 56, No. 7, pp. 369-372.
Doty, Patrick F., et al., "Elpasolite Scintillators", Sandia Report SAND2012-9951 Unlimited Release, Dec. 2012, 109 Pages.
Doty, F.P., et al., "Structure and Properties of Lanthanide Halides", Proceedings of the SPIE, 2007, vol. 6707, pp. 670705-1-670705-11.
Findley, K.O., et al., "Fracture and Deformation Behavior of Common and Novel Scintillating Single Crystals", Proceedings of the SPIE, 2007, vol. 6707, pp. 670706-1-670706-12.
Harrison, M.J., "Initial Investigation of Strengthening Agents for Lanthanide Halide Scintillators", Proceedings of the SPIE, 2007, vol. 6707, pp. 67070B-1-67070B-10.
Hohenberg, et al., "Inhomogeneous Electron Gas", Physical Review B, 1964, vol. 136, pp. 864-B871.
Iseler, G.W., et al., "Horizontal Gradient-Freeze Growth of InP Crystals Under Controlled Pressure", Indium Phosphide and Related Materials, 1990, Second International Conference, pp. 25-29.
Kataoka, T., "Yield Strength and Dislocation Mobility for KCl-KBr Solid Solution Single Crystals", Japanese Journal of Applied Physics, 1977, vol. 16, No. 7, pp. 1119-1126.
Kramer, K.W., et al., "Development and Characterization of Highly Efficient New Cerium Doped Rare Earth Halide Scintillator Materials", 2006, Journal of Materials Chemistry, vol. 16, pp. 2773-2780.
Lee, W., et al., "Comparative Measurements of LaBr3(Ce) and LaCl3(Ce) Scintillators Coupled to PSPMT", 2005, IEEE Transaction on Nuclear Science, vol. 52, No. 4, pp. 1119-1122.
Nadgornyi, E.M., "Dislocation Dynamics and Mechanical Properties of Crystals", 1988, vol. 3, pp. 1-530.
"Quantum Espresso", Retrieval Date: Feb. 5, 2015, Retrieved at <<http://www.quantum-espresso.org/>>, 5 pages.
"VASP", Retrieval Date: Feb. 5, 2015, Retrieved at <<http://www.vasp.at/>>, 1 page.

* cited by examiner

*Primary Examiner* — C Melissa Koslow
(74) *Attorney, Agent, or Firm* — Medley, Behrens & Lewis, LLC

(57) ABSTRACT

A stabilized scintillator includes a compound corresponding to formula (2) or (3), or activated derivatives thereof:

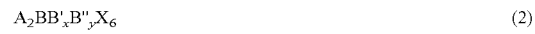

(2)

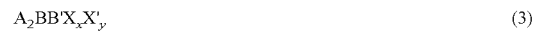

(3)

wherein A and B are monovalent cations, B' is a trivalent cation, X is a halogen, x and y are molar percentages, x+y=1; B" is an aliovalent exchange cation that has a different valence than B', X' is an aliovalent exchange anion that has a different valence than X. A method of preparing the stabilized scintillator is also disclosed.

20 Claims, 9 Drawing Sheets

STABILIZED SCINTILLATOR

GOVERNMENT RIGHTS

This invention was made with Government support under Contract No. DE-AC04-94AL85000 between Sandia Corporation and the U.S. Department of Energy. The Government has certain rights in the invention.

BACKGROUND

Scintillators are materials that emit flashes or pulses of light when they interact with ionizing radiation. Scintillator crystals are widely used in radiation detectors for gamma-rays, X-rays, cosmic rays, and particles characterized by an energy level of greater than about 1 keV. It is possible to make radiation detectors, by coupling the crystal (or scintillator) with an element for detecting the light produced by the crystal when it interacts, or "scintillates," when exposed to a source of radiation. The photo-detector produces an electrical signal proportional to the intensity of the scintillation (or light pulses received from the scintillator material). The electrical signal is then processed in various ways to provide data on the radiation.

Inorganic compounds in the elpasolite family ($A_2BB'X_6$, wherein A and B represent monovalent cations, B' represents a trivalent cation, such as rare earth or transition metals, and X represents halogen ions) are promising scintillators for gamma and neutron detection. However, inhomogeneity and poor optical quality are often observed in different regions of single crystal elpasolites that are grown from the melt. Commonly, the first-to-freeze region is cloudy, transitioning to a relatively clear middle region, while the last-to-freeze region may be cloudy to opaque.

SUMMARY

The cloudy or opaque regions in the first-to-freeze and last-to-freeze regions of elpasolites indicate unstable solidification. It was discovered that these regions are cloudy or opaque because they decompose completely or partially to form undesired phases or light-scattering second phase particles. These cloudy or opaque regions degrade scintillation properties.

To improve the stability of scintillator compositions and improve photoluminescence properties, novel scintillator compositions, methods of predicting stabilizing modifications to scintillator compositions, and methods making stabilized scintillator compositions are disclosed herein. This disclosure applies to polycrystals and ceramics. It may also apply to glassy (amorphous) materials produced by rapid solidification of compositions described herein.

The term "scintillator" is understood to include intrinsic (self-activated) or extrinsic (activated by isovalent substitution of a luminescent ion for a minor amount of a host ion) scintillators, which may be single crystals, polycrystals, ceramics, or disordered phases.

DETAILED DESCRIPTION

Figure 1:
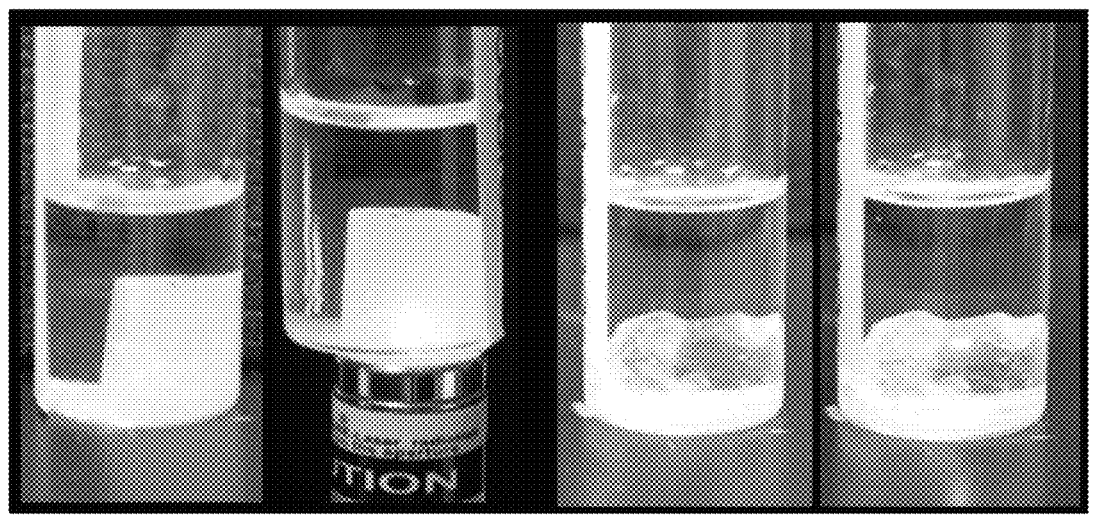
FIG. 1 shows photos of the base elpasolite compound $Cs_2NaCeBr_6$ under room light only (1st from left) and illuminated from below with a laser ($2^{nd}$ from left) and the stabilized $Cs_2NaCeBr_6$ compound after undergoing aliovalent cationic exchange with $Ca_2^+$ ($3^{rd}$ from left) and illuminated from below with a laser (4th from left).

Various technologies pertaining to stabilized scintillator materials, are now described. In the following description, for purposes of explanation, numerous specific details are set forth in order to provide a thorough understanding of one or more aspects. It may be evident, however, that such aspect(s) may be practiced without these specific details.

Available scintillation materials fail to meet requirements for energy resolution and sensitivity at room temperature. The still emerging lanthanide-halide based materials, which give the desired luminosity and proportionality, have proven difficult to efficiently produce in large sizes due to their intrinsic brittleness and highly anisotropic nature.

Cubic materials, such as some members of the elpasolite family ($A_2BB'X_6$, wherein A and B represent monovalent cations, B' represents trivalent cations, such as rare earths or transition metals, and X represents halogen ions), hold great promise due to their high light output, proportionality, and potential for scale-up. Many of these materials retain cubic or nearly cubic crystal structures over a range of compositions, and they have demonstrated desirable scintillation properties including pulse shape discrimination, high luminosity, and proportional response. The isotropic cubic structure leads to minimal thermomechanical stresses during single crystal solidification, and eliminates the problematic light scattering at grain boundaries.

Therefore, cubic elpasolites could be produced in large sizes as either single-crystal or transparent ceramics with high production yield and reduced costs. This class of materials may yield the first large, low-cost gamma spectrometers approaching theoretical energy resolution. However, there are challenges with these materials, one of which, is the unstable freezing from the melt state that results in the degradation of scintillation properties.

Commonly, the first-to-freeze region is cloudy, transitioning to a relatively clear middle region, while the last-to-freeze region may be cloudy to opaque. The cause of this inhomogeneity was determined to be the fact $A_2BB'X_6$ compounds decompose partially to form light-scattering or absorbing second phase particles.

For example, as detailed further below, the neutron elpasolite scintillator $Cs_2LiYCl_6$ decomposes according to reaction (I).

$$3Cs_2LiYCl_6 \rightarrow 2Cs_3YCl_6 + 3LiCl + YCl_3 \qquad \text{(I)}$$

More generally, in embodiments, elpasolite scintillators may decompose into the reaction products $A_3B'X_6$, BX, and $B'X_3$ as shown in reaction (II)

$$3A_2BB'X_6 \rightarrow 2A_3B'X_6 + 3 BX + B'X_3 \qquad (II)$$

wherein A and B are monovalent cations, B' is trivalent cation, and X is a halogen. Other decomposition reactions have been identified, and the method disclosed herein have been shown to stabilize the materials against these reactions.

In an embodiment of a stabilized scintillator, the crystal structure of a scintillator compound is stabilized by an aliovalent cation or anion exchange. It was determined that in many instances, a selected crystal, such as an elpasolite, will become more stable when an aliovalent exchange is made that causes the internal energy of the crystal to be reduced. The improved stability reduces the decomposition reactions and thereby improves mechanical and scintillation characteristics of the compound. In addition, even scintillators not subject to decomposition may also be stabilized. For example, certain crystals form polymorphs, crystals with the same composition but a different structure. It was discovered that aliovalent substitution often favors the high temperature structure by either lowering its energy, or by slowing the transformation kinetics. Kinetic stabilization is related to thermodynamic stabilization and in an embodiment, both types of stabilization may be achieved at once.

Aliovalent exchange comprises substituting an ion having a different valence (aliovalent) than the host lattice ion it replaces. This method of substitution introduces longer range strain in the crystal structure versus other methods of substitution such as isovalent exchange. Both approaches (isovalent and aliovalent) strain the underlying crystal lattice, but the effect in aliovalent substitution only requires introduction of a small amount of the aliovalent element to dramatically alter the minimum stress required to initiate slip on a given slip plane within a crystal (known as the critical resolved shear stress, or "CRSS").

Not all ion exchanges promote stability in a crystal compound. However, it has been found that aliovalent exchanges that reduce internal crystal energy are good indicators of improved stability. It is not an obvious correlation that an aliovalent exchange that produces a reduced internal energy in the crystal will improve crystal stability. In a heuristic only approach, the crystal energy is determined solely by the work required to assemble ions with fixed charges equal to the formal valence. However, this is a gross oversimplification, because it ignores charge transfer and covalent bonding between ions, lattice relaxation, and other effects. It might be expected that a stabilization by exchanging ions in the lattice would be also stabilize the decomposition products. However, empirical results disclosed herein illustrate this is not the case.

Bond-valence theory calculations of internal crystal energy provide a good indicator of aliovalent exchange dopants and mol percentages that successfully reduce decomposition reactions and improve crystal stability. Bond-valence calculations are also straightforward and not as computationally intensive compared to more complicated, but formally exact, models for determining crystal energy.

For a more formally exact calculation of internal crystal energy, density functional theory (DFT), may be used to determine if aliovalent exchange with certain cations or anions will stabilize crystals and suppress decomposition. DFT accounts for relaxation of internal structural coordinates and lattice strains, to compute total free energy of exchange reactions. For example, lattice strains will be different for exchange of different sized ions.

DFT calculations were performed as explained in the Example section to predict suitable aliovalent exchanges to reduce decomposition reactions of elpasolite. The results showed that aliovalent exchange does not always result in improved stability or reduction, and no simple rule based on valence or ionic radii is apparent. However, the results showed that a reduction in internal energy of the crystal was a good predictor of improved stability and decreased decomposition reactions.

A base elpasolite scintillator in an undoped state has a structure (1).

$$A_2BB'X_6 \qquad (1)$$

In structure (1), A and B are monovalent cations, B' is a trivalent cation, and X is a halogen.

In an embodiment, the elpasolite of structure (1) has undergone a cationic aliovalent exchange and corresponds to structure (2). (It may also be an activated derivative of structure 2, e.g. doped with Ce ion.)

$$A_2BB'_xB''_yX_6 \qquad (2)$$

In structure (2), x and y are molar percentages, and x+y=1. B" is the aliovalent exchange cation that has a different valence than B'. The B" exchange cation provides a reduction in internal crystal energy of the corresponding unmodified compound of structure (1).

In an embodiment, an elpasolite scintillator has undergone an anionic aliovalent exchange and corresponds to structure (3).

$$A_2BB'X_xX'_y \qquad (3)$$

In structure (3), x and y are molar percentages, and x+y=6. X' is the aliovalent exchange anion that has a different valence than X. The X' exchange anion is selected to provide a reduction in internal crystal energy of the corresponding unmodified compound of structure (3).

In an embodiment, the scintillator is exclusive of lanthanum halides.

The A and B monovalent cations may, for example, be independently selected, from the group consisting of the following monovalent cations: $Li^+$, $Na^+$, $K^+$, $Rb^+$, $Cs^+$. In an embodiment, the monovalent cations are selected from those that do not have multiple common valence states.

The B' trivalent cation may, for example, be selected from transition metals and rare earth elements. For example, the B' trivalent cation may be selected from the group consisting of: $P^{3+}$, $Ir^{3+}$, $Al^{3+}$, $Ti^{3+}$, $Cr^{3+}$, $Ga^{3+}$, $In^{3+}$, $Gd^{3+}$, $Sc^{3+}$, $Y^{3+}$, $La^{3+}$, $Ce^{3+}$, $Pr^{3+}$, $Nd^{3+}$, $Pm^{3+}$, $Sm^{3+}$, $Eu^{3+}$, $Tb^{3+}$, $Dy^{3+}$, $Ho^{3+}$, $Tm^{3+}$, $Yb^{3+}$, $Lu^{3+}$.

The B" aliovalent exchange cation has a valance other than 3. The IUPAC Group 2, 4, 12, and 14 cations with valences other than 3 may, for example, be selected. These have a marked effect on the mechanical properties of ionic crystals doped with these materials, on a per-mole basis. For example, the cations may be selected from divalent and/or tetravalent cations. Divalent cations may be selected, for example, from $Ca^{2+}$, $Sr^{2+}$, $Zn^{2+}$, $Cd^{2+}$, and $Ba^{2+}$. Tetravalent cations may be selected, for example, from $Zr^{4+}$ and $Hf^{4+}$. Combinations of cations of valences other than 3 may also be used for the aliovalent exchange cations. The aliovalent exchange cation should be selected to lower the internal crystal energy of the unmodified composition.

The X halogen ion, may, for example, be selected from any of the halogens, or chlorine, fluorine, bromine, and iodine or combinations thereof.

The X' anion may be selected from anions having a valence other than −1, such as, for example, $Te^{2-}$, $Se^{2-}$, or $S^{2-}$ or mixtures thereof.

In the cationic aliovalent exchange corresponding to formulae (1) and (2), the B" cation typically replaces a very small percent of the B' cation. This is because the introduction of an additional species has a tendency to "quench" scintillation. The molar percent of B" (y), when the molar amount of B' and B" is considered to be 1, may, for example, be 0.001% to 2.5%, such as for example, 0.01% to 1%, or 0.05 to 0.5%. The molar percent of B' (x) is thus, for example, the complement of these percentages so that their sum equals 100%.

In the anionic aliovalent exchange corresponding to formulae (1) and (3), the molar percent for X' (y), when the molar amount of X and X' is considered to be 1, may, for example, be 0.001% to 2.5%, such as for example, 0.01% to 1%, or 0.05 to 0.5%. The molar percent of X (x) is thus, for example, the complement of these percentages so that the sum of the molar percentages of X and X' equals 100%.

In an embodiment the stabilized scintillator crystal shows clarity throughout and does not display the cloudiness at the beginning and ending areas of crystal formation that are present in the base compound. In addition, in an embodiment, a crystal of the stabilized scintillator is substantially uniform throughout in light scattering of laser light. Substantially uniform in this instance, also encompasses completely uniform, and includes 10% or less, such as 5% or less, and 3% to 0.01% differences in laser light scattering. In an embodiment of the stabilized scintillator, the aliovalent exchange cation B" has an ionic radius within 10% of an ionic radius of an ion of a host lattice; or the aliovalent exchange anion X' has an ionic radius within 10% of an ion of a host lattice.

In an embodiment the stabilized scintillator crystal shows clarity throughout and does not display the cloudiness at the beginning and ending areas of crystal formation that are present in the base compound. In addition, in an embodiment, a crystal of the stabilized scintillator is substantially uniform throughout in light scattering of laser light. Substantially uniform in this instance, also encompasses completely uniform, and includes 10% or less, such as 5% or less, and 3% to 0.01% differences in laser light scattering.

In an embodiment, the stabilized scintillator is substantially free of decomposition reaction products, e.g., light scattering particles, such as, for example, 99% to 100% free, 98% to 99.9% free, or 95% to 99% free of decomposition reaction products. In embodiments corresponding to formulae (1), the decomposition reaction has the general formula (II) and the general decomposition reaction products are shown on the left side of the reaction of formula (II):

$$3A_2BB'X_6 \rightarrow 2A_3B'X_6 + 3BX + B'X_3 \quad \quad (II)$$

In embodiments the stabilized scintillator also has improved photoluminescence quantum yield over a base compound of structure (1) having the same components, except for the aliovalent exchanged ion. The improvement may, for example, be up to 10 times the quantum yield of the base compound, such as, for example, 10% to 500% improvement, or 50% to 200% improvement.

In an embodiment, the stabilized scintillators of formulae (2) or (3) have improved (decreased) dominant decay time over a base compounds of structure (1) having the same components, except for the aliovalent exchanged ion. The improvement may, for example, be a decrease of up to 20% of the dominant decay time of the base compound, such as, for example, 15% to 1% decrease, or 10% to 3% decrease.

In an embodiment, the stabilized scintillators disclosed above have improved (decreased) gamma peak width at 662 keV (17.84→15.68), over a base compound of structure (1) having the same components, except for the aliovalent exchanged ion. The improvement may, for example, be a decrease of up to 20% of the gamma peak width at 662 keV over the base compound, such as, for example, 15% to 1% decrease, or 10% to 3% decrease.

Industrially suitable elpasolites for the base structure (1) may be selected with guidance provided herein and from Doty, Zhou, Yang, and Rodriguez, "Elpasolite Scintillators," Sandia National Laboratories, printed December 2012 (available to the public from U.S. Department of Commerce), which is hereby incorporated by reference. Elpasolites identified in that publication are promising for their manufacturability and mechanical properties and are suitable for stabilizing with the aliovalent exchange described herein. In an embodiment, the elpasolites may be self-activated. As known to those of skill in the art, Ce ion is commonly used to dope scintillator materials to activate them for scintillation. Activated materials (by Ce ions or other known compounds) may be described as activated derivatives.

Table 1 shows lattice parameters and tolerance factors for certain lanthanum-based elpasolite halides (all activated (doped) compounds consist of 5 atm. % $Ce^{+3}$). Implications can be drawn for material selection in order to minimize the anisotropic thermomechanical stresses developed in single crystal growth or to reduce the amount of light scattering in polycrystalline ceramics.

TABLE 1

| Material | Crystal structure | Lattice parameters (Å) | | | Tolerance factor (t) |
| --- | --- | --- | --- | --- | --- |
| | | a | b | c | |
| $Cs_2LiEuCl_6$ | Cubic (Fm-3m) | 10.544(1) | 10.544(1) | 10.544(1) | 0.980 |
| $Cs2LiYCl_6$ | Cubic (Fm-3m) | 10.479(1) | 10.479(1) | 10.479(1) | 0.988 |
| $Cs_2LiErCl_6$ | Cubic (Fm-3m) | 10.446(1) | 10.446(1) | 10.446(1) | 0.990 |
| $Cs_2LiLaBr_6:Ce^{3+}$ | Cubic (Fm-3m) | 11.2890 | 11.2890 | 11.2890 | 0.951* |
| $Cs2LiYBr_6$ | Cubic (Fm-3m) | 11.017(1) | 11.017(1) | 11.017(1) | 0.973 |
| $Cs_2LiLaI_6:Ce^{3+}$ | Non-cubic | n/a | n/a | n/a | 0.935* |
| $Cs_2NaEuCl_6:Ce^{3+}$ | Cubic (Fm-3m) | 10.552(2) | 10.552(2) | 10.552(2) | 0.934* |
| $Cs_2NaLaBr_6:Ce^{3+}$ | Tetragonal | 8.1416 | 8.1416 | 11.580 | 0.909* |
| $Cs_2NaErBr_6$ | Cubic (Fm-3m) | 11.262(1) | 11.262(1) | 11.262(1) | 0.931 |
| $Cs_2NaErBr_6:Ce^{3+}$ | Cubic (Fm-3m) | 11.269(1) | 11.269(1) | 11.269(1) | 0.931* |
| $Cs_2NaLaI_6:Ce^{3+}$ | Orthorh. (Pnma) | 8.7615 | 12.4361 | 8.6270 | 0.897* |
| $Cs_2NaGdBr_6$ | Cubic (Fm-3m) | 11.351(2) | 11.351(2) | 11.351(2) | 0.924 |

TABLE 1-continued

| Material | Crystal structure | Lattice parameters (Å) | | | Tolerance factor (t) |
|---|---|---|---|---|---|
| | | a | b | c | |
| $Cs_2NaGdBr_6:Ce^{3+}$ | Cubic (Fm-3m) | 11.360(1) | 11.360(1) | 11.360(1) | |
| $Cs_2Na(Yb_{0.5}Ce_{0.5})Br_6$ | Cubic (Fm-3m) | 11.360(1) | 11.360(1) | 11.360(1) | 0.924 |

*Calculated t does not include cerium concentration.

In an embodiment, a method comprises predicting improved stability, and synthesizing a stabilized scintillator.

The predicting step is performed by selecting a base scintillator crystal composition, and calculating a reduced crystal energy of the base scintillator from the aliovalent exchange of a small amount of a cation or anion. The aliovalent exchange ion is then selected based on the calculations. The selection may be based on what ion shows the greatest decrease in internal crystal energy. Ions with multiple oxidation state may not be as effective as ions with single valence states. Ions that are radioactive (like $Lu^{+3}$) may work, but be undesirable for low radiation applications. In addition, ions with excited states within the bandgap of the host may produce colored material that absorbs part of the scintillation energy.

The calculations for determining the reduced crystal energy may, for example, be bond-valence calculations or DFT calculations.

In an embodiment, bond-valence calculations may be used to predict stabilizing aliovalent exchange ions. Tables 2 and 3 provide some basic examples of relevant bond-valence calculations for the substitution of Na with other alkali ions in NaCl compounds, showing unrelaxed exchange energy provides an indication of stability.

TABLE 2

| Host | BV parameters/ Angstroms | | Bond valence [v.u.] | Bond strength [eV] | Cation removal energy [eV] |
|---|---|---|---|---|---|
| NaCl | r0 | 2.82 | 0.16 | 0.19 | 1.13 |
| | r1 | 2.15 | | | |
| | b1 | 0.37 | | | |

TABLE 3

| Host | BV parameters/ Angstroms | | Bond valence [v.u.] | Bond strength [eV] | Unrelaxed cation exchange energy [eV] |
|---|---|---|---|---|---|
| BeCl | r2 | 1.76 | 0.06 | 0.02 | 2.11 |
| | b2 | 0.37 | | | |
| MgCl | r3 | 2.08 | 0.14 | 0.13 | 1.48 |
| | b3 | 0.37 | | | |
| CaCl | r4 | 2.37 | 0.30 | 0.61 | -1.44 |
| | b4 | 0.37 | | | |
| SrCl | r5 | 2.51 | 0.43 | 1.31 | -5.62 |
| | b5 | 0.37 | | | |
| BaCl | r6 | 2.69 | 0.70 | 3.47 | -18.55 |
| | b6 | 0.37 | | | |

Tables 2 and 3 illustrate that substitution of Na with Ca, Sr, or Ba, should result in a stabilized compound, since their unrelaxed exchange energies based on bond valence sums are negative. This is reasonable, since performing structure optimization will generally reduce the energy further. Generally, the base values (bond valence parameters) to perform these types of calculations for other compounds corresponding to formula (1) are known and can be used to make predictions for aliovalent substitutions that will stabilize the compound. Further values and information for making bond-valence calculations is contained in Brown, Ian David, "Recent Developments in the Methods and Applications of the Bond Valence Model," Chem. Reviews, 2009, Vol. 109, No. 12, 6858-6919, which is incorporated herein by reference.

In Tables 2 and 3, for example, using Brown's equation 26 with published parameters for the ion pairs, individual bond valences were computed. Brown's equation 26 is $S=\exp((R_0-R)/b)$, where S is the experimental bond valence, R the observed bond length, and $R_0$ and b are fitted bond valence parameters. $R_0$ represents the nominal length of a bond of unit valence, and b measures the softness of the interaction between the two atoms. According to Brown, this equation is now the most widely used relation, and the values of $R_0$ and b are available in literature and on the Internet.

In the particular example of Tables 2 and 3, the cation exchange energy is the difference of removing two $Na^+$ ions from NaCl (breaking 12 Na—Cl bonds) and emplacing a doubly charged ion in one of the $Na^+$ sites (forming 6 bonds of a different type).

A negative net result in Tables 2 and 3 means the exchange should stabilize the crystal. This is not obvious and can be compared with an electrostatic argument. That is, bond valence sums give a different result than the heuristic Madelung energy calculation taught by Lalena and Cleary (Principles of Inorganic Materials Design, Wiley, 2010 p. 215), since not all divalent cations lower the energy. The electrostatic calculation assumes periodicity (defect ordering) extending to infinity, whereas the bond-valence method computes the energy of isolated defects. In an embodiment, the calculation steps of the method are performed on a computer.

In another embodiment, DFT quantum mechanical calculations are used to predict the ions that should be used for the aliovalent substitution. Quantum mechanical calculations have two advantages: (a) they do not require any assumptions other than atomic numbers of elements; and (b) they produce accurate results in the context that they do not use any input information.

Quantum mechanical calculations derive all material properties based on electron wave functions. Electron wave functions are solved from Schrödinger equation for electrons:

$$\hat{H}\Psi = \left[\sum_{i=1}^{N}\left(-\frac{\hbar^2}{2m_i}\nabla_i^2\right) + \sum_{i=1}^{N}V(\vec{r}_i) + \sum_{i=1}^{N}\sum_{j>i}^{N}U(\vec{r}_i,\vec{r}_j)\right]\Psi = E\Psi \quad (A)$$

where $$\nabla^2 = \frac{\partial^2}{\partial x^2} + \frac{\partial^2}{\partial y^2} + \frac{\partial^2}{\partial z^2}, \hbar = \frac{h}{2\pi},$$

h is Planck constant, $m_i$ is electron mass, $v(\vec{r})$ is potential energy from the external field due to positively charged nuclei, U is electron-electron interaction energy. Equation (A) represents a many-body problem involving N electrons. Simultaneously solving the many-body problem is not possible even for simple molecules involving a few electrons.

Density functional theory (DFT) is based on recognition that the ground state properties of a many-electron system are uniquely determined by a total electron density. P. Hohenberg and W. Kohn (1964). "Inhomogeneous electron gas". Physical Review B 136, 864-B871. This means that the many-body (electron) problem can be reduced to one-body (total electron density) problem (equation B):

$$\left[\frac{\hbar^2}{2m_i}\nabla^2 + V_s(\vec{r})\right]\phi_i(\vec{r}) = \varepsilon_i\phi_i(\vec{r}) \quad (B)$$

where $$V_s(\vec{r}) = V(\vec{r}) + \int \frac{e^2 \rho(\vec{r}')}{|\vec{r}-\vec{r}'|} d^3r' + V_{XC}[\rho(\vec{r})]$$

is the effective single particle potential, $$\int \frac{e^2\rho(\vec{r}')}{|\vec{r}-\vec{r}'|}d^3r'$$

is electron-electron Coulomb repulsion, and $V_{XC}[\rho(\vec{r})]$ is exchange-correlation potential. Solving equation (B) means solving electron wave function $\phi_i(\vec{r})$ for all orbitals (i=1, 2, . . . , N) at energy level $\varepsilon_i$, which in turn gives electron density $$\rho(\vec{r}) = \sum_{i=1}^{N} |\phi_i(\vec{r})|^2.$$

The biggest unknown in DFT is the exchange-correlation potential $V_{XC}[\rho(\vec{r})]$. However, various approximations can be used to derive $V_{XC}[\rho(\vec{r})]$. For most elements, the functionals required to perform DFT are readily available in literature. Numerous DFT codes are available including Quantum Espresso, which is available as open source software by QuantumEspresso.org. Quantum Espresso references a printed publication, P. Giannozzi, et al, J. Phys. Condens. Matter, 21, 395502 (2009). Another DFT code is the commercially available VASP software, part of Materials Design's MedeA software environment. Contact information for VASP is Computational Materials Physics, Sensengasse 8/12, A-1090, Vienna, Austria.

The DFT calculations required in energy calculations can be done by those of skill in the art, and can be done using a single desktop computer. In principle, energy of any crystal can be calculated using 3 steps: (a) create the crystal by defining positions of all atoms in the unit cell of the crystal; (b) download the pseudopotentials (which incorporate the exchange-correlation potentials) of all the elements; (3) write an input file that specifies how to run the DFT code (i.e., let unit cell and atom positions to freely move to minimize energy), and submit the calculation. The calculated relaxed energy will be written in the output file of the calculation. This internal crystal energy data can be used the same as the bond valence energy results to predict what aliovalent substitutions will provide stabilization.

In general a method of predicting and synthesizing a stabilized scintillator includes, selecting an elpasolite scintillator, calculating an internal crystal energy for a group of aliovalent exchange ions (e.g., by bond valence or DFT methods), selecting one or more ions that calculations showed reduced the internal crystal energy of the scintillator, and synthesizing the stabilized scintillator by performing aliovalent exchange with the selected ion or ions.

At least three different approaches, solution synthesis solid-state reaction, and melt synthesis, may be used to fabricate the lanthanum-based elpasolite. Generally, the salts of the scintillator and the aliovalent exchange ion are melted, allowed to diffuse or mix, and then cooled at a temperature sufficient to freeze the melt into a solid state.

Growth of elpasolite crystals may be accomplished through melt-solidification methods, such as the Bridgman method wherein the crucible, or "boat," of molten material is directionally cooled to nucleate and grow a crystal boule. This method typically uses binary halide starting materials weighed out in the correct stoichiometric proportions for an elpasolite plus an activator, for example, CsCl, LiCl, $YCl_3$, and $CeCl_3$ in molar ratios of 2:1:0.95:0.05.

In an embodiment using the melt synthesis method, halide salts, including, for example, CsI, NaI, LiI, $LaI_3$, CeI3, CsBr, NaBr, LiBr, $LaBr_3$, and $CeBr_3$, may be used to directly synthesize these elpasolites. However, compounds from this list do not form a single compound. These salts may be mixed and ground for several hours.

An alternate embodiment may use CsBr, LiBr, $LaBr_3$ and a small portion of $CeBr_3$ to make $Cs_2Li(La_{1-x}Ce_x)Br_6$, where the Ce is a minor constituent than produces the luminescence. This is known as CLLB:Ce or cerium activated CLLB. CLLB is the host, and Ce(III) ion is the activator. All Cerium host materials are self-activated.

These halide salts, in particular the $LaBr_3$ and the $LaI_3$, are highly oxophilic. They tend to reduce refractory materials in the box furnace and form oxyhalides (LaOBr and LaOI) during solid-state reactions. To prevent such a reaction, the ground, mixed salts may, for example, be loaded into a fused quartz ampoule in an argon-filled glovebox and subsequently vacuum sealed for the melting synthesis. In an embodiment, the ground powder in the ampoule is first heated to 200° C. under vacuum to remove any residual hydrates. After dehydration, the powder may be heated to about 70% of the highest melting point of initial salt in a double quartz tube for solid-state reaction.

This approach provides a desirable compound at a lower temperature to prevent decomposition. However, it involves additional complexity in the process, and the resulting powder is quite reactive and prone to absorb water during subsequent handling.

In an embodiment, elpasolite halides may be synthesized by melting and solidifying these formed halide salts (either from powder or beads) in, for example, vacuum-sealed quartz ampoules.

The aliovalent exchange is performed during the synthesis by providing the aliovalent ion in an additional salt. For example, in an embodiment, $Cs_2LiYCl_6$:Ce would be grown as explained above, and use the following proportions: 2 moles CsCl, 1 mole LiCl, 1-x moles of $YCl_3$, and x moles of $CeBr_3$ to activate (wherein x is less than 1), and an excess quantity such as 1% (by mol) of $ZnCl_2$. The Ce ion bonds with the Y sites in the crystal. Some of the Zn bonds to the lithium sites, such as, for example, 0.05% to 0.2%, or 0.1%, due to its limited solubility. The molar amount of aliovalent salt added will typically be much greater than the amount that substitutes in the solid. In embodiments, an amount representing the maximum solubility of the aliovalent salt is the goal, and may, for example, require at least 10%, such as about 3% to 8% excess be added to the melt. Different amounts may be found to be preferable for different applications. In one embodiment, the stabilized scintillator crystals are grown by melting the component salts, such as, for example, AX, BX, B'X$_3$, AX$_2$, as those variables are defined above. These salts typically melt at high temperatures, including, for example, over 600° C., such as 605° C. to 801° C. or 721° C. to 1000° C. After melting, the highly energetic system may mix by diffusion, or in some embodiments, other mixing methods known in the art may be employed. After the melt composition is sufficiently mixed, which may take, for example, over one hour, such as 4 to 8 hours, or 16 to 24 hours, the melt mixture is cooled, below a freezing temperature of the crystal compound. This may be accomplished, for example, by slowly moving an ampoule containing the melt mixture, from the hottest zone of a furnace away from the hottest zone and eventually to room temperature. In other embodiments, the cooling may be more rapidly performed, such as by moving the melt mixture quickly into a room temperature or controlled temperature environment.

EXAMPLES

Example 1 Determination of Decomposition Reactions

A study was undertaken to determine the cause of cloudy appearances in the first and ending state of crystallization of elpasolites. It was determined that the neutron scintillator Cs$_2$LiYCl$_6$ decomposes according to reaction (IV):

$$3Cs_2LiYCl_6 \rightarrow 2Cs_3YCl_6 + 3LiCl + YCl_3 \quad (IV)$$

The Cs$_3$YCl$_6$ phase was first detected by differential scanning calorimetry (DSC) in a cloudy section of a Cs$_2$LiYCl$_6$ laboratory grown crystal. Positive identification of the structure was made using powder x-ray diffraction (XRD). Subsequently, many such phases were identified in both elpasolite compounds and their cerium-activated alloys. A partial list of these elpasolites and decomposition products is tabulated in Table 4 below:

TABLE 4

| Elpasolite | Second phases detected by XRD |
|---|---|
| Cs$_2$NaCeBr$_6$ | Cs$_3$CeBr$_6$ |
| Cs$_2$LiYCl$_6$ | Cs$_3$YCl$_6$ |
| Cs$_2$LiGdCl$_6$ | Cs$_3$GdCl$_6$ |
| Cs$_2$NaScI$_6$ | Cs$_3$Sc$_2$I$_9$, Cs$_3$ScI$_6$ |
| Cs$_2$NaGdBr$_6$ | Cs$_3$Gd$_2$Br$_9$ |
| Cs$_2$LiGdCl$_6$:Ce3+ | Cs$_3$GdCl6 |
| Cs$_2$NaGdBr$_6$:Ce3+ | Cs$_3$Gd$_2$Br$_9$ |
| Cs$_2$LiLaBr$_6$:Ce3+ | Cs$_3$La$_2$Br$_9$ |

These results also show substitution of a portion of lanthanum or gadolinium with cerium (isovalent cation exchange) did not prevent decomposition during growth from the melt. The same was true for a number of isovalent anion substituted alloys; i.e. mixed halide crystals. These also exhibited light-scattering particles. Therefore, isovalent solid solutions are in general susceptible to the same instability during melt growth as the pure compounds.

Examples 2A and 2B

The stabilizing effect of Ca$^{2+}$ in Cs$_2$NaCeBr$_6$ was experimentally confirmed. Two crystals were grown by the Bridgman method under identical conditions, except in Example 2B, 2 mole % CaBr$_2$ was added with the other salts during synthesis. This represented an excess of Ca$^{2+}$. Some Ca$^{2+}$ ions exchange for Na$^+$ in this case. The amount was not determined, but was estimated to be about 0.2%.

Generally Bridgman growth is controlled by moving the ampoule 0.1 to 10 or 100 mm/hour, such as, 1-3 mm/hour through a temperature gradient of 2-10 K/cm, depending on the material, gradient, and ampoule diameter. In this particular example, the parameters were FIG. 1 shows photos of the Example 2A base elpasolite compound Cs$_2$NaCeBr$_6$ under room light only (1$^{st}$ from left) and illuminated from below with a laser (2$^{nd}$ from left) and the stabilized Example 2B Cs$_2$NaCeBr$_6$ compound after undergoing aliovalent cationic exchange with Ca$_2^+$ (3$^{rd}$ from left) and illuminated from below with a laser (4$^{th}$ from left). The stabilized compound was water clear under room light, and showed practically no scattering of the laser light.

Examples 3 and 4

Two additional elpasolite scintillators showed successful stabilization (suppression of secondary phases) as well as improved performance. In Example 3, a self-activated Cs$_2$NaCeBr$_6$ was formed. In Example 4 a Ce$^{3+}$ activated CsLiYCl$_6$ was formed.

In Example 4, the Cs$_2$LiYCl$_6$:Ce was grown by the Bridgman method, and the following proportions of salts were used: 2 moles CsCl, 1 mole LiCl, 1 mole of YCl$_3$, and 1% (by mol) of ZnCl$_2$.

The self-activated Cs$_2$NaCeBr$_6$ of Example 3 was grown by the analogous method used in Example 4 but without the Ce activator.

DFT calculations to determine the internal crystal energy of the crystal after aliovalent substitution led to the selection of exchange ions Ca$^{2+}$ for Example 3 and Zn$^{2+}$ for Example 4.

Analysis of the crystal grown in Example 3, (Ca exchange) showed that it suppressed decomposition and improved energy resolution. In addition, analysis of the Example 3 crystal showed an increase in photoluminescence quantum yield (30.4→37.0%), a decrease in dominant decay time (61.7→52.5 ns), a decrease in gamma peak width at 662 keV (11.45→9.18), and a decrease in non-proportionality at low energy (1.29→1.27 @60 keV). These results would not be expected given that introduction of impurities tends to degrade scintillation properties.

Evidence of these results in shown in FIGS. 2-5.

Figure 2:
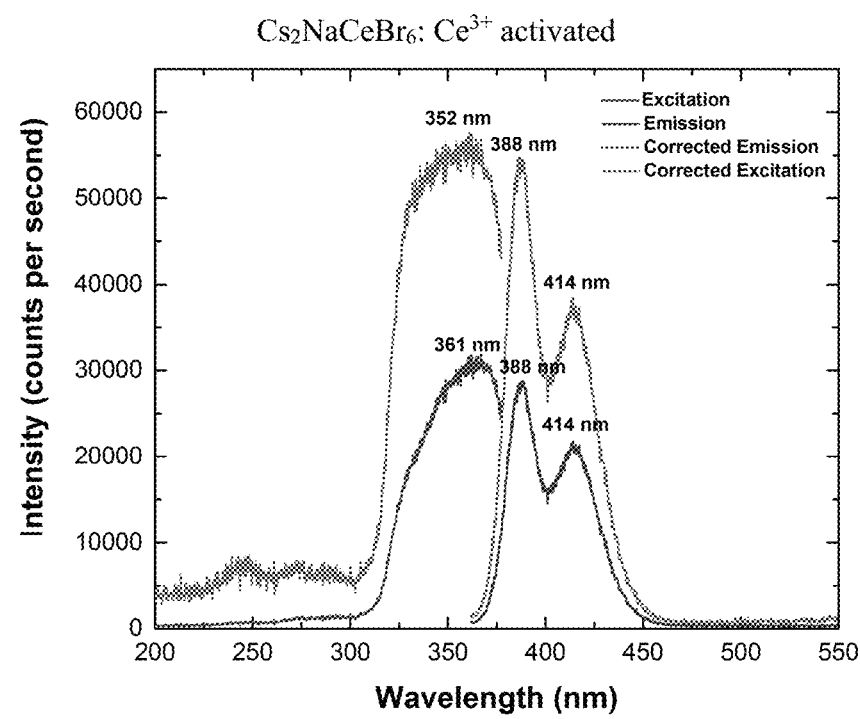
FIG. 2 shows plots with photoluminescence data for the base and modified Example 3 compound.
Figure 2:
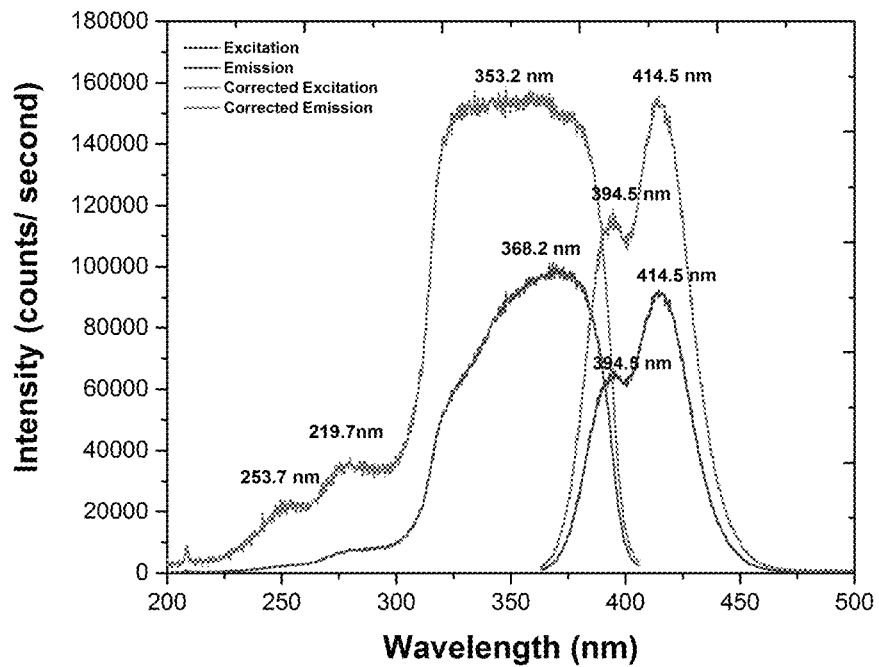

FIG. 2 shows photoluminescence data for the base and modified Example 3 compound. Intensity was plotted vs. wavelength and the peaks were integrated. Further data relating to FIG. 2 is in Table 5.

TABLE 5

| | Base Ce activated scintillator: Cs$_2$NaCeBr$_6$ Peak Area | Modified Ce activated scintillator: Cs$_2$NaCeBr$_6$ + Ca$^{2+}$ Peak Area |
|---|---|---|
| 338.5 nm-366.5 nm | 2257338 | |
| 336.5 nm-458.0 nm | 687519 | |

TABLE 5-continued

| | Base Ce activated scintillator: $Cs_2NaCeBr_6$ Peak Area | Modified Ce activated scintillator: $Cs_2NaCeBr_6 + Ca^{2+}$ Peak Area |
|---|---|---|
| 340.5 nm-367.5 nm: | | 448034 Total Area: 4451729 |
| 367.5 nm-463.0 nm: | | 1627810 Total Area: 1647386 |
| Quantum Yield= | 687519/2257338 = 30.4% | 1647386/4451729 = 37.0% |

Figure 3:
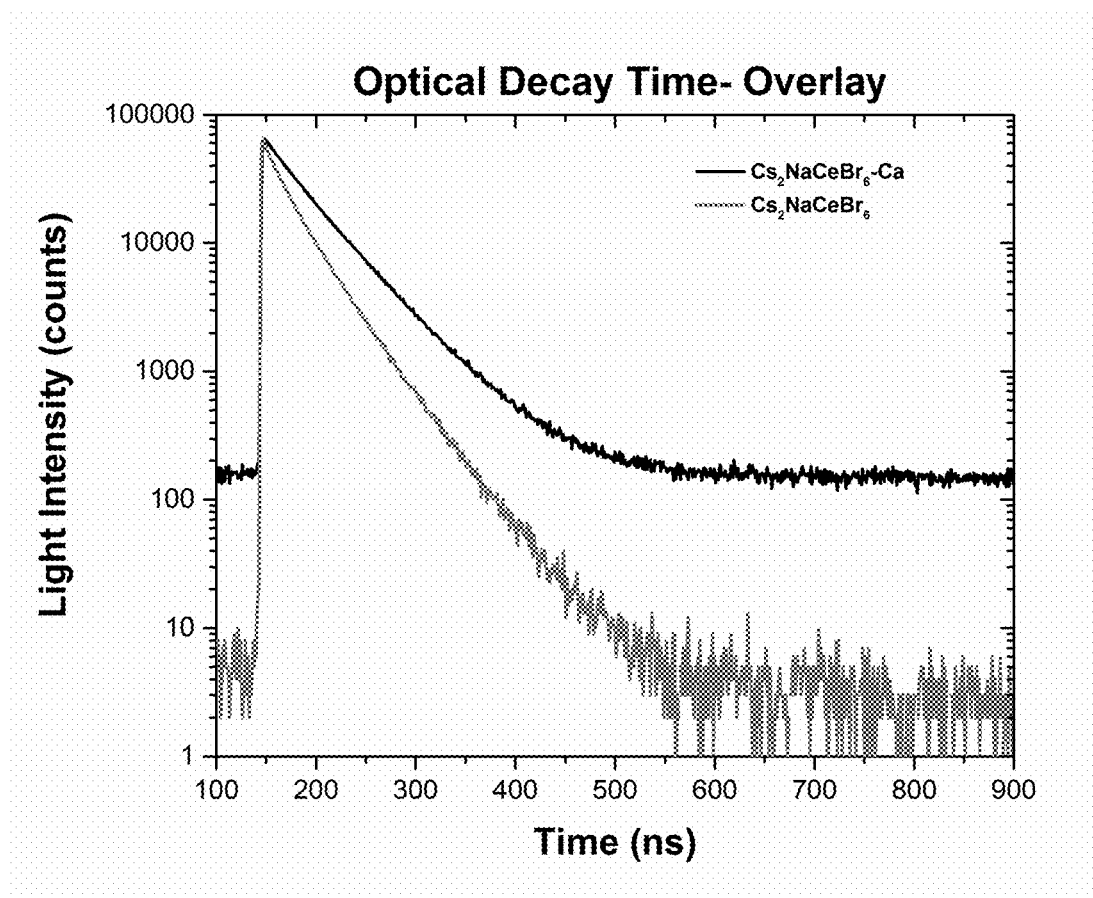
FIG. 3 is a light intensity over time plot showing the optical decay time of Example 3 compounds (base and modified).

FIG. 3 shows a plot of the optical decay time of Example 3 compounds (base and modified). Table 6 shows additional data correlating to FIG. 3.

Table 6

| | Base Ce activated scintillator: $Cs_2NaCeBr_6$ Lifetime | Modified Ce activated scintillator: $Cs_2NaCeBr_6 + Ca^{2+}$ Lifetime |
|---|---|---|
| Tau1 | 26.54 ± 1.06 ns | 29.17 ± 7.58 ns (% of signal with given lifetime 31.73 ± 1.35%) |
| Tau2 | 61.71 ± 3.56 ns | 52.49 ± 2.47 ns (% of signal with given lifetime 68.27 ± 1.55%) |

Figure 4:
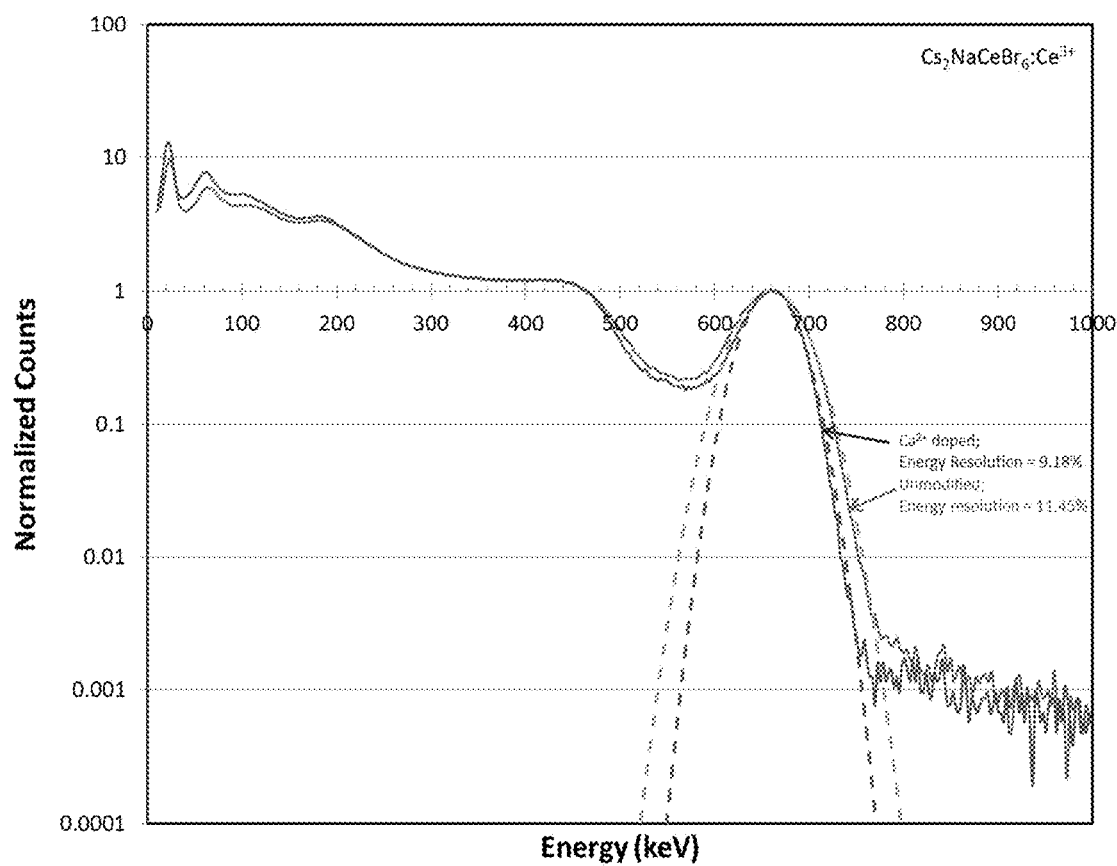
FIG. 4 is an energy plot showing the effect of aliovalent exchange on energy resolutions of the base and modified Example 3 compounds.

FIG. 4 shows the effect of aliovalent doping on energy resolutions of the base and modified Example 3 compounds.

Figure 5:
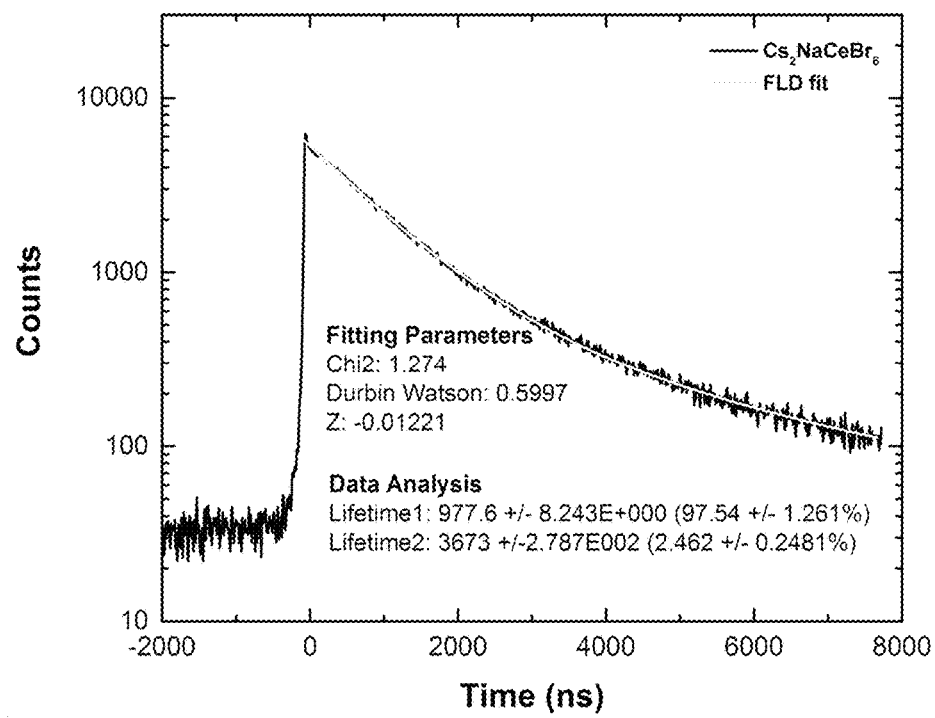
FIG. 5 shows light intensity over time plots of the radioluminescence decay of the base and modified Example 3 compounds.
Figure 5:
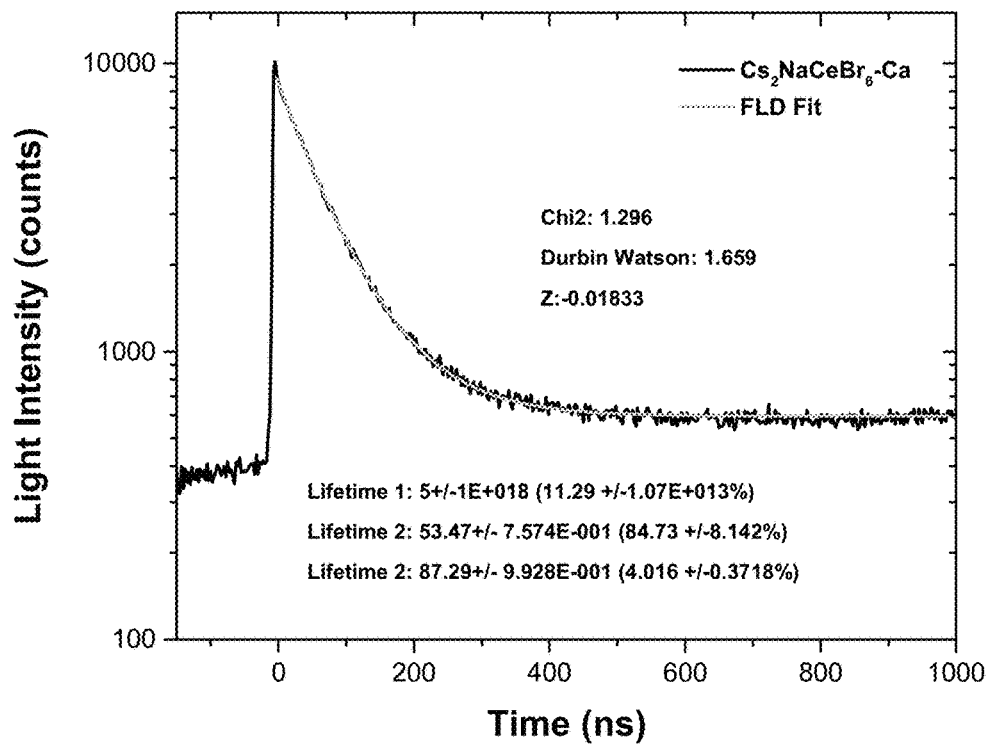

FIG. 5 shows the radioluminescence decay behavior of the base and modified Example 3 compounds.

Analysis of the crystal grown in Example 4 (Zn exchange) showed that it suppressed decomposition and improved energy resolution. In addition, analysis of the Example 4 crystal showed an increase in photoluminescence quantum yield (27.0 to 96.6%), decrease in dominant decay time (27.2 to 24.5 ns), decrease in gamma peak width at 662 keV (17.84→15.68), and non-proportionality at low energy 1.304 @60 keV. Again, these results would not be expected given that introduction of impurities tends to degrade scintillation properties.

Figure 6:
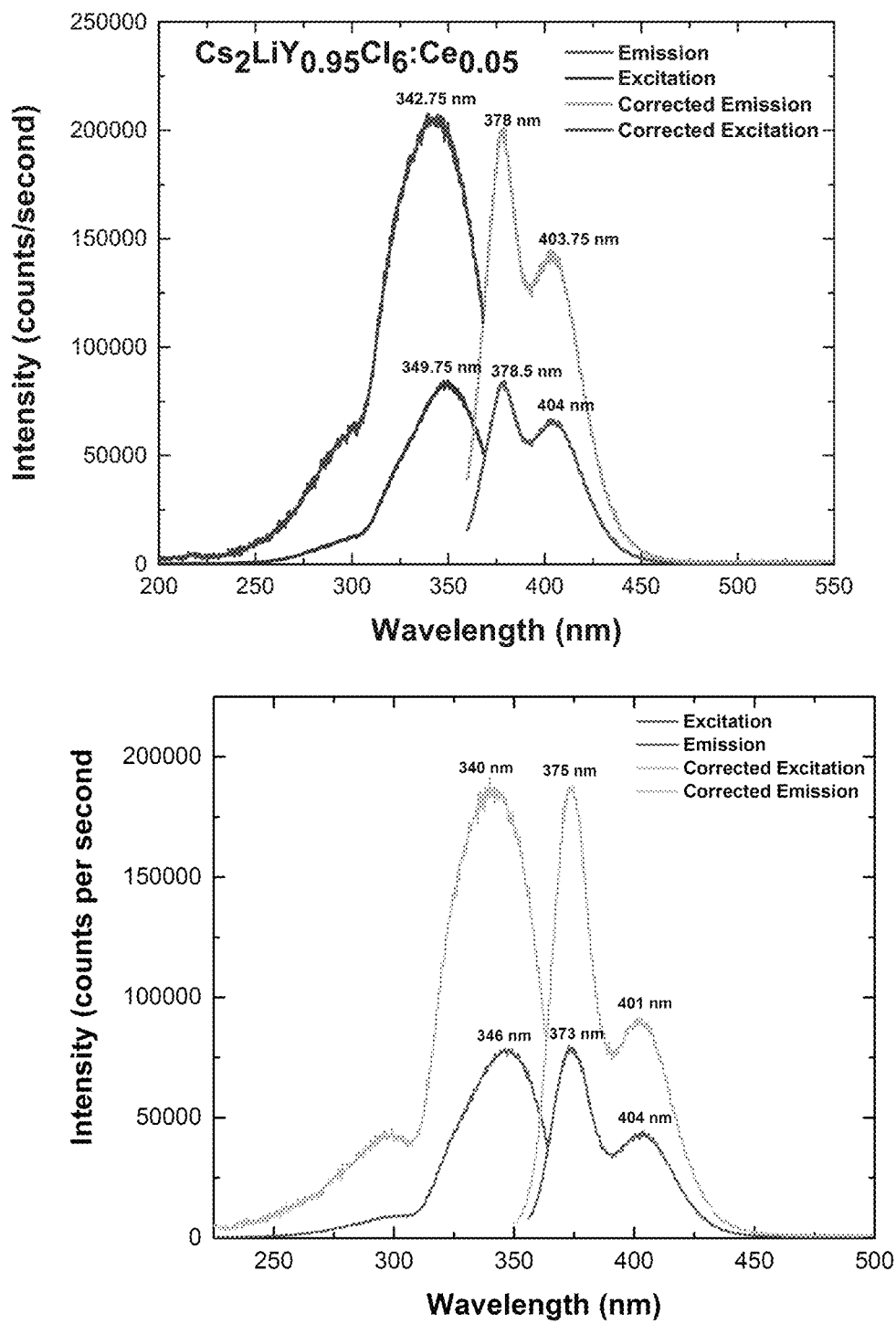
FIG. 6 shows plots with photoluminescence data for the base and modified Example 4 compound.

FIG. 6 shows photoluminescence data of the base and modified Example 4 compounds. Intensity was plotted vs. wavelength and the peaks were integrated to determine quantum yield as indicated above. Integration data is shown on the Figure.

Figure 7:
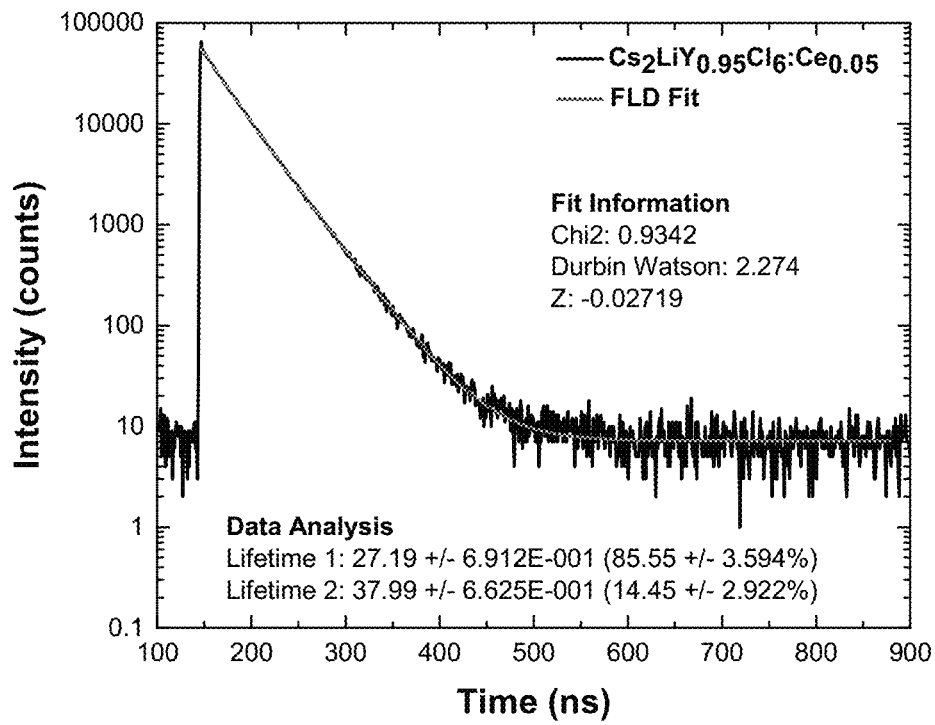
FIG. 7 shows intensity over time plots showing the optical decay time of the base and modified Example 4 compounds.
Figure 7:
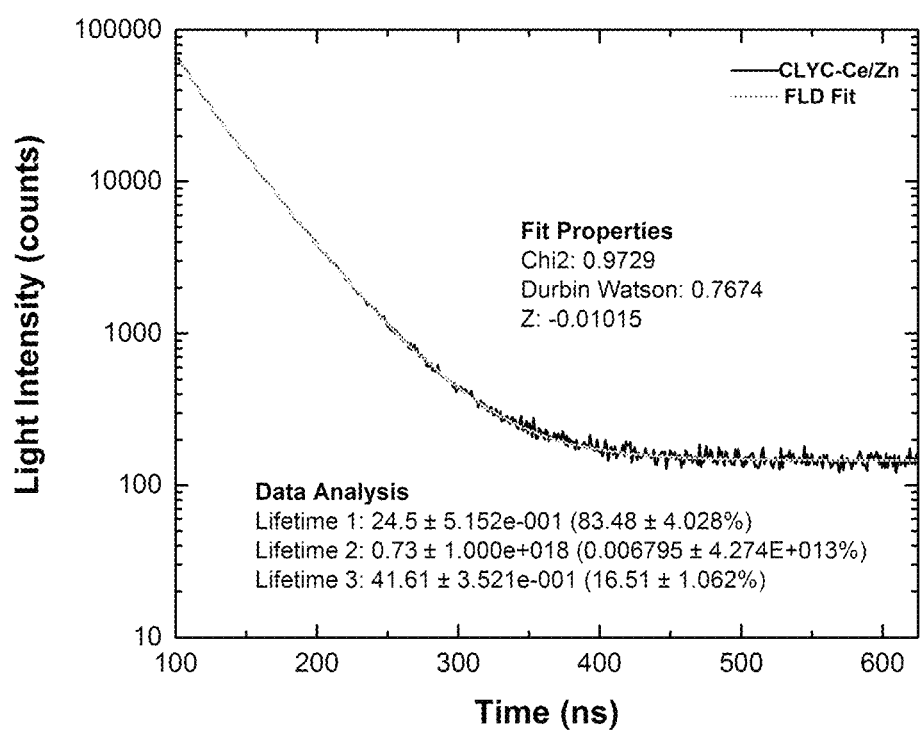

FIG. 7 shows the optical decay time of the base and modified Example 4 compounds. The lifetime data is shown on the Figure.

Figure 8:
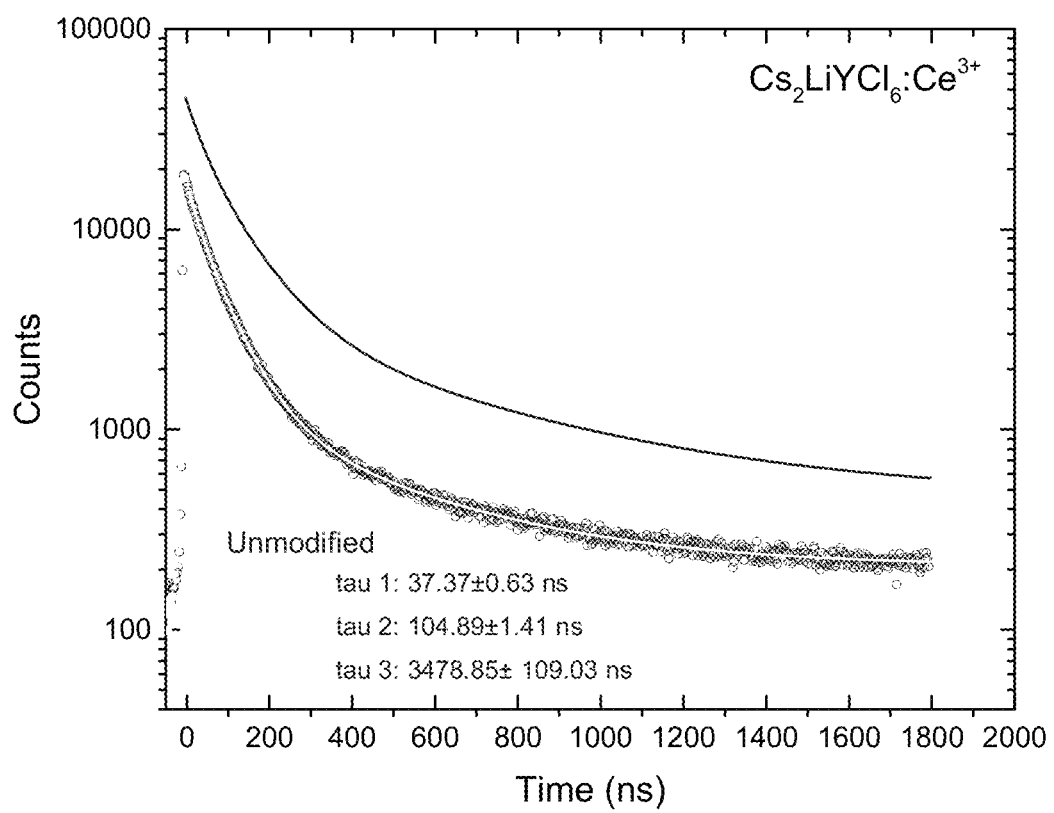
FIG. 8 is a plot showing the radioluminescence decay behavior of the base and modified Example 4 compounds.

FIG. 8 shows the radioluminescence decay behavior of the base and modified Example 4 compounds.

Figure 9:
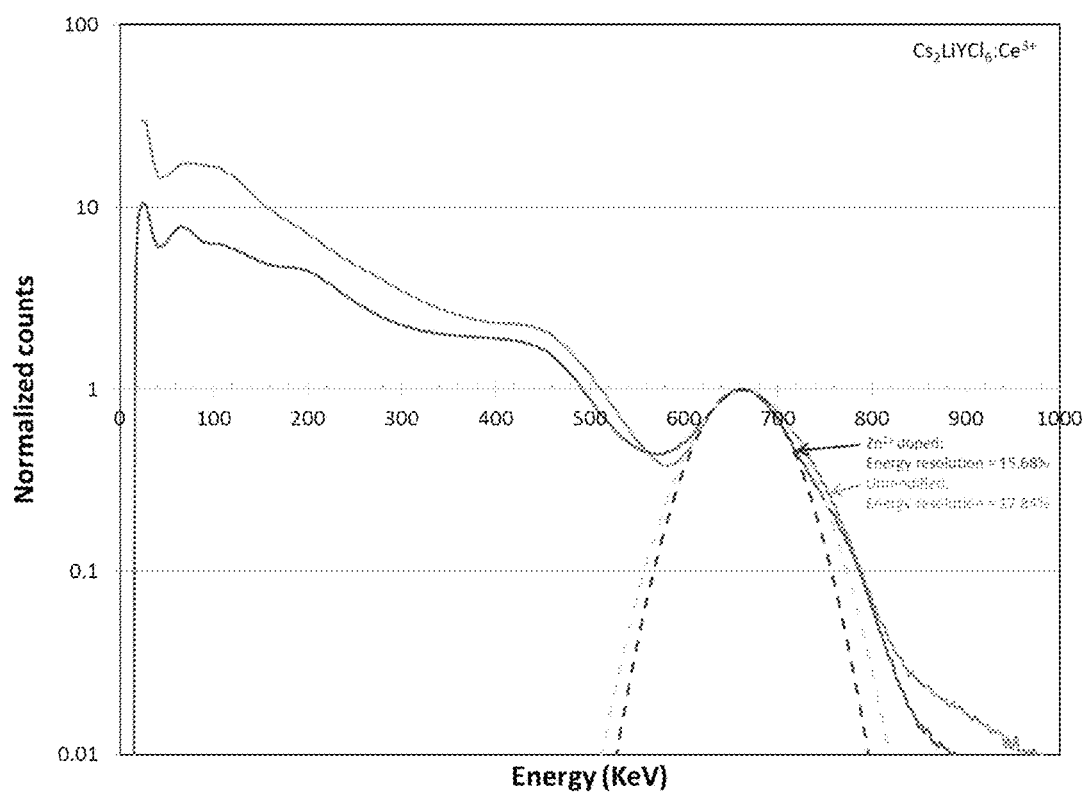
FIG. 9 is an energy plot showing the effect of aliovalent exchange on energy resolutions of the base and modified Example 4 compounds.

FIG. 9 shows the effect of aliovalent doping on energy resolutions on the Example 4 compounds.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should be appreciated that the terms "a," "an," and "the" mean "one or more," unless the context clearly indicates the contrary. In addition, the term "or" is not meant as an exclusive "or," unless the context clearly indicates the contrary. It should also be appreciated that reference throughout this specification to "one embodiment", "an embodiment", "embodiments", "one or more embodiments," or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A stabilized scintillator, comprising:
   a compound corresponding to formula (3), or activated derivatives thereof:

$$A_2BB'X_xX'_y \qquad (3)$$

wherein A and B are monovalent cations, B' is a trivalent cation, X is a halogen, x and y are molar percentages, wherein x+y=6; X' is an aliovalent exchange anion that has a different valence than X;
   wherein a crystal of the stabilized scintillator is clear throughout;
   wherein the stabilized scintillator has improved photoluminescence quantum yield over a base compound of structure (1)

$$A_2sBB'X_6 \qquad (1)$$

wherein A, B, B' and X are the same as above.

2. The stabilized scintillator of claim 1, wherein the stabilized scintillator is a modified elpasolite and has a lower internal crystal energy than the base compound of structure (1)

$$A_2BB'X_6 \qquad (1)$$

wherein A, B, B' and X are the same as in claim 1.

3. The stabilized scintillator of claim 2, wherein the X' aliovalent exchange anion is present in the stabilized scintillator in an effective amount to produce the lower internal crystal energy compared to the base compound of structure (1).

4. The stabilized scintillator of claim 1, wherein the aliovalent exchange anion X' has an ionic radius within 10% of an ion of a host lattice.

5. The stabilized scintillator of claim 1, wherein y is 0.001% to 2.5% of x+y.

6. The stabilized scintillator of claim 1, wherein a crystal of the stabilized scintillator is substantially uniform throughout in light scattering of laser light.

7. The stabilized scintillator of claim 1, wherein the stabilized scintillator is substantially free of decomposition reaction products.

8. The stabilized scintillator of claim 1, wherein the B' trivalent cation is selected from trivalent transition metals and rare earth elements.

9. The stabilized scintillator of claim 1, wherein the A and B monovalent cations are selected from the group consisting of: $Li^+$, $Na^+$, $K^+$, $Rb^+$, and $Cs^+$; the X halogen anion is selected from the group consisting of: $F^-$, $Cl^-$, $Br^-$, and $I^-$, and the B' trivalent cation is selected from the lanthanide elements selected from the group consisting of: $La^{3+}$, $Nd^{3+}$, $Eu^+$, $Er^{3+}$, $Ce^{3+}$, $Sc^{3+}$, $Y^{3+}$, and $Gd^{3+}$.

10. The stabilized scintillator of claim 1, wherein photoluminescence quantum yield is at least 10% greater than the base compound of structure (1).

11. A stabilized scintillator, comprising:
a compound corresponding to formula (2), or activated derivatives thereof:

$$A_2BB'_xB''_yX_6 \qquad (2)$$

wherein A and B are monovalent cations, B' is a trivalent cation, X is a halogen, x and y are molar percentages, wherein in formula (2) x+y=1, and B" is an aliovalent exchange cation that has a different valence than B';
wherein a crystal of the stabilized scintillator is clear throughout;
wherein the aliovalent exchange cation is selected from the list consisting of $Zn^{2+}$, $Cd^{2+}$, $Pb^{2+}$;
wherein the stabilized scintillator has improved photoluminescence quantum yield over a base compound of structure (1)

$$A_2BB'X_6 \qquad (1)$$

wherein A, B, B' and X are the same as above.

12. The stabilized scintillator of claim 11, wherein the A and B monovalent cations are independently selected from the group consisting of: $Li^+$, $Na^+$, $K^+$, $Rb^+$, $Cs^+$, $Gd^+$.

13. The stabilized scintillator of claim 11, wherein the B' trivalent cation is selected from the group consisting of: $P^{3+}$, $Al^{3+}$, $Ga^{3+}$, $Gd^{3+}$, $Sc^{3+}$, $Y^{3+}$, $La^{3+}$, $Ce^{3+}$, $Pr^{3+}$, $Nd^{3+}$, $Pm^{3+}$, $Sm^{3+}$, $Tb^{3+}$, $Dy^{3+}$, $Ho^{3+}$, $Er^{3+}$, $Tm^{3+}$, $Yb^{3+}$, $Lu^{3+}$.

14. The stabilized scintillator of claim 11, wherein the A and B monovalent cations are selected from the group consisting of: $Li^+$, $Na^+$, $K^+$, $Rb^+$, and $Cs^+$; the X halogen anion is selected from the group consisting of: $F^-$, $Cl^-$, $Br^-$, and $I^-$, and the B' trivalent cation is selected from the lanthanide elements selected from the group consisting of: $La^{3+}$, $Nd^{3+}$, $Eu^{3+}$, $Er^{3+}$, $Ce^{3+}$, $Sc^{3+}$, $Y^{3+}$, and $Gd^{3+}$.

15. The stabilized scintillator of claim 11, wherein the stabilized scintillator is a modified elpasolite and has a lower internal crystal energy than the base compound of structure (1)

$$A_2BB'X_6 \qquad (1)$$

wherein A, B, B' and X are the same as in claim 11.

16. The stabilized scintillator of claim 11, wherein the aliovalent exchange cation B" has an ionic radius within 10% of an ion of a host lattice.

17. A method for predicting improved stability in a scintillator, and synthesizing a stabilized scintillator, the method comprising:
selecting a base scintillator compound, wherein the base scintillator compound is an elpasolite;
calculating a reduced crystal energy of the base scintillator from the aliovalent exchange of an ion;
selecting an aliovalent exchange ion based on the calculations;
synthesizing the stabilized scintillator including a step of performing aliovalent exchange with the selected ion.

18. The method of claim 17, wherein the calculating of the reduced crystal energy of the base scintillator from the aliovalent exchange of an ion is performed with bond-valence calculations or density functional theory calculations.

19. The method of claim 17, wherein the stabilized scintillator is a compound corresponding to formula (2) or (3), or activated derivatives thereof:

$$A_2BB'_xB''_yX_6 \qquad (2)$$

$$A_2BB'X_xX'_y \qquad (3)$$

wherein A and B are monovalent cations, B' is a trivalent cation, X is a halogen anion, x and y are molar percentages, wherein in formula (2) x+y=1 and in formula (3) x+y=6; B" is an aliovalent exchange cation that has a different valence than B', and X' is an aliovalent exchange anion that has a different valence than X.

20. The method of claim 17, wherein synthesizing the stabilized scintillator further comprises melting salts containing elements of base scintillator compound and the aliovalent exchange ion;
wherein the step of performing aliovalent exchange with the selected ion includes allowing the salts to diffuse in a melt state, mixing the melted salts, or both;
after the diffusing or mixing, cooling the melted material at a temperature sufficient to freeze the melt to a solid state.

* * * * *